United States Patent

[11] 3,630,713

[72] Inventors Ben E. Adams;
 William H. Lawhon; Billy C. Phillips, all of Carlsbad, N. Mex.
[21] Appl. No. 746,452
[22] Filed July 22, 1968
[45] Patented Dec. 28, 1971
[73] Assignee Duval Corporation
 Houston, Tex.

[54] METHOD OF PRODUCING FERTILIZER GRANULES
 9 Claims, 1 Drawing Fig.
[52] U.S. Cl. .................................................. 71/61,
 71/63, 71/64 DC, 71/64 DB, 71/64 E
[51] Int. Cl. .................................................. C05d 1/00,
 C05d 5/00
[50] Field of Search ........................................... 71/1, 64 E,
 64 D, 61, 62, 63; 23/89, 121, 313

[56] References Cited
 UNITED STATES PATENTS
| 1,956,849 | 3/1934 | Eyer et al. | 71/64 E X |
| 2,030,583 | 2/1936 | Haas et al. | 71/61 X |
| 2,107,701 | 2/1938 | Haase et al. | 71/61 |
| 2,107,702 | 2/1938 | Haase et al. | 71/61 |
| 2,480,694 | 9/1949 | Atwood | 23/89 X |
| 2,660,541 | 11/1953 | Rinkenbach | 71/64 F |
| 2,806,773 | 9/1957 | Pole | 71/64 E |
| 3,126,255 | 3/1964 | Cooke et al. | 23/121 X |
| 3,223,518 | 12/1965 | Hansen | 71/64 E |
| 3,392,007 | 7/1968 | Christoffel et al. | 71/33 |
| 976,793 | 11/1910 | Ellis | 71/50 X |
| 3,113,015 | 12/1963 | Bradt et al. | 23/313 X |

*Primary Examiner*—Reuben Friedman
*Assistant Examiner*—Richard Barnes
*Attorneys*—J. Vincent Martin, Joe E. Edwards, M. H. Gay and Jack R. Springgate ABSTRACT: A method of producing competent granules of a potassium salt fertilizer which includes the steps of grinding and granulating the material with an easily dehydrated magnesium salt and Portland cement allowing time for hydration of the granules, filling the voids of the granules with an inorganic salt solution and lightly coating the granules with a coating liquid and wherein the method may be conducted without either or both of the last two steps and may be conducted without the addition of the magnesium salt and Portland cement and the hydration step.

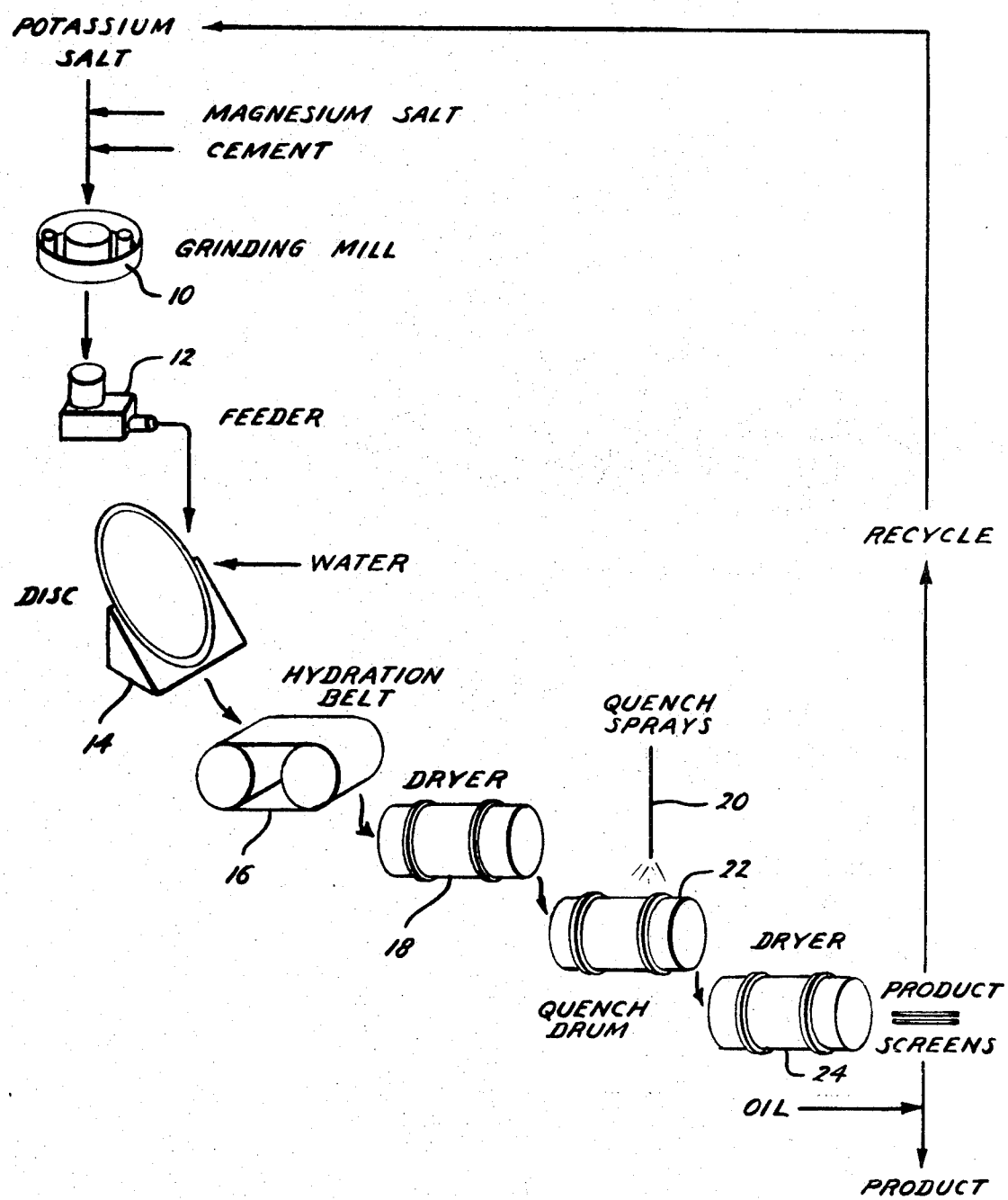

METHOD OF PRODUCING FERTILIZER GRANULES

BACKGROUND OF THE INVENTION

Generally, bulk-blended, dry fertilizers are mixtures of three or four basic plant nutrients. In such mixtures, the particle size of the components must be approximately the same or segregation of the components will occur. Such segregation is disadvantageous when the fertilizer is applied to a field since portions of the field will have a deficiency of one component and an excess of other components. This condition produces "waving" of the crop which in turn causes poor yields and renders harvesting with automatic equipment difficult.

One of the causes of segregation in such fertilizers is the breaking down of the granules of one or more of the components to produce fines. It is desired that the fertilizer granules of all components of the mixture have a minimum preselected competency or resistance to degradation or crushing in mixing, handling and during application.

SUMMARY

The present invention relates to an improved method of producing granules of a fertilizer material having the desired competency or resistance to degradation without reducing the nutrient quality of the fertilizer below a desired level.

It is an object of the present invention to provide an improved method of producing fertilizer granules of improved competency and high available plant nutrient content.

Another object is to provide an improved method of economically producing large-sized potassium salt fertilizer granules having substantially improved competency.

A further object is to provide an improved method of producing a uniform and commercially acceptable potassium salt fertilizer product.

BRIEF DESCRIPTION OF THE DRAWING

These and other objects and advantages of the present invention are hereinafter set forth and explained with reference to the drawing wherein:

The FIGURE is a schematic flow diagram to illustrate the steps in the method of the present invention.

DESCRIPTION OF THE PREFERRED EMBODIMENTS

Since the competency of granular fertilizers is one of the controlling factors on the acceptability of the granular components, a measure of such competency is useful. One method of measuring this competency or hardness of the granules has been developed and used by the Tennessee Valley Authority. This method involves limited milling of fertilizer samples under standardized conditions in a small ball mill, followed by screen analysis to determine size degradation. The mill used is a cylinder 10 inches in diameter by 12 inches long equipped with four equally spaced, full-length flights having a width of 1 inch. One quart of fertilizer is placed in the mill together with 100 steel balls of 5/16 inch diameter. The mill is then rotated for 5 minutes at 60 revolutions per minute. In the examples hereinafter set forth, most of the samples have been granular mixed fertilizers between −6 to +20 mesh size, and the decrease in the +20 mesh fraction during milling has been taken as a measure of strength of the particles. Granular fertilizers that give 5 percent or less decrease in the +20 mesh fraction are considered to have good particle strength. This method has been used in evaluating the competency or degradation of granules and results therefrom are included in the examples hereinafter set forth.

The improved method of the present invention involves the combination or separate use of three different concepts. The first concept includes the addition of an easily dehydrated magnesium salt and a binder such as Portland cement to the fertilizer salts, forming granules of such combined materials and allowing time for the granules to hydrate. The second concept involves the quenching of dried granules with an aqueous solution of an inorganic salt and drying the quenched granules. This second concept may be used with fertilizer salt granules produced by the method of the first concept or other fertilizer salt granules. The third concept involves coating the fertilizer granules with a coating liquid and may be used on granules produced by the methods of the first concept, the second concept or a combination of the first and second concepts. For purposes of simplicity of description, the flow diagram of the drawing illustrates the steps in a method using all three of these concepts.

In the FIGURE, the potassium salt such as potassium sulfate or potassium chloride is fed to the grinding mill 10 together with an easily dehydrated magnesium salt and Portland cement. The ingredients are ground in the grinding mill 10 wherein some of the heat-generated functions to dehydrate the magnesium salt.

The ground homogeneous mixture is metered by the rate-controlled feeder 12 to the granulator 14. Water, which may be in the form of an aqueous solution, is added to the ground feed in the granulator 14. Aqueous solutions such as water solutions of potassium salts, magnesium salts and ammonia may be used. Granulator 14 is shown as a disc-type granulator but any type of granulating device may be used which causes the ground feed to be formed into granules or pellets. A typical example of this production of granules was demonstrated when 300 pounds per hour of a ground feed material was fed to a disc-type granulator having a 39-inch disc positioned at an angle of 50 degrees to the pan and rotated at 16 r.p.m. Water was added to produce a preponderance of granular material in the size range between −6 and +16 mesh.

The granules discharge from the granulator 14 onto the hydration belt 16 on which they are carried to the first dryer 18. The hydration belt 16 is a slow-moving belt on which the granules remain for a preselected period of time (set or hydration time) to allow the granules to hydrate or set. It has been found that at least 9 minutes and preferably 15 minutes of set or hydration time should be provided from the time the granules are discharged from the granulator 14 until they are fed to the first dryer 18. The chemical and hydration reactions of the magnesium salt and the Portland cement takes place during this period. While longer periods than 15 minutes may be advantageous, they produce improvement in the granule competency at a decreasing rate. It has been found that periods shorter than 9 minutes adversely affect the competency of the product.

The drying of the granules in the first dryer 18 removes the free water from the granules. Such drying step is preferably conducted slowly since rapid drying has been found to produce a hard shell around the granules which traps steam within the interior and thereafter may cause the granules to rupture explosively, thereby destroying the granules.

The dried granules from dryer 18 are quenched or sprayed with a saturated aqueous solution of an inorganic salt such as potassium sulfate or potassium chloride in any suitable manner, for example, the illustrated quench spray 20 into the quench drum 22. A potassium sulfate solution would be used with potassium sulfate fertilizers and a potassium chloride solution would be used with potassium chloride fertilizers. The purpose of this quenching step is to fill the voids and capillaries of the granules with the solution so that when the quenched granules are dried in the second dryer 24, the solute remains in the interstices of the granules whereby the density of the granule is increased. Tests have shown an increase in density of a granule treated in this manner from 70 to 85 percent of the natural crystal density of the material. The degradation of natural potassium chloride crystals is 1.73 percent and of artificial potassium sulfate crystals is 1.90 percent. The second drying step in dryer 24 should not be too rapid since rapid drying, as previously explained, may trap steam within the granule and ultimately destroy the granule.

After the completion of the second drying step, the granular product is screened and all of the granules which are larger or smaller than a preferred range of granule sizes are recycled for combination with the original feed to the grinding mill 10.

The granules which fall within the desired size range are coated with a light coat of coating liquid, such as a vegetable oil or a high wax content oil as hereinafter explained. The coating of the granules is performed after the screening so the recycled undersized and oversized granules are not coated. Thus, recycling of the coating liquid to the feed stream is prevented.

Table 1 (below) shows the separate and combined effects of the addition of Portland cement and an easily dehydrated magnesium salt (leonite, $K_2SO_4 \cdot MgSO_4 \cdot 6H_2O$) on the degradation of potassium sulfate granules. As previously stated, a degradation of 5 percent or less is an acceptable product.

TABLE 1

| Percent $K_2SO_4$ | Percent Leonite | Percent Cement | Percent Degradation |
|---|---|---|---|
| 98.0 | 0 | 0 | 17.2 |
| 94.8 | 1.8 | 0 | 17.0 |
| 90.2 | 8.1 | 0 | 8.1 |
| 86.7 | 10.9 | 0 | 7.4 |
| 98.0 | 0 | 1 | 16.5 |
| 96.8 | 1.5 | 1 | 7.1 |
| 89.4 | 7.5 | 1 | 5.4 |
| 88.3 | | 1 | 4.5 |
| 86.8 | 10.1 | 1 | 4.7 |

From this table, it can be seen that the use of Portland cement alone provides some improvement in degradation, but does not reduce the degradation to 5 percent or less. Also, the use of Leonite without the Portland cement improves the degradation but even with 10.9 percent Leonite, the granules produced do not have a satisfactory competency. Use of more Leonite will reduce the purity of the potash salt below the commercial acceptance level. Use of 1 percent Portland cement and from 8 to 10 percent Leonite in the process as outlined above results in granules having less than 5 percent degradation.

An example of another magnesium salt which has been found to produce acceptable granules under the present invention is Epsom salts. Table 2 illustrates the effect of Epsom salts and Portland cement on the granule degradation.

TABLE 2

| Percent $K_2SO_4$ | Percent Epsom Salts | Percent cement | Percent Degradation |
|---|---|---|---|
| 98.0 | 0 | 1.0 | 16.5 |
| 92.0 | 5.4 | 1.0 | 5.2 |
| 90.0 | 7.3 | 1.0 | 4.3 |

From table 2, it can be seen that from approximately 6 to 7.3 percent Epsom salts used with 1 percent of Portland cement in making granules by the previously described process produces granules having an acceptable competency.

The granules which were tested to obtain the results shown in tables 1 and 2 were produced in a process substantially as described without the use of the quench sprays 20 and without the addition of a coating liquid after screening.

Another factor which has been discovered to have an effect on the granule competency or degradation is the size distribution of the feed to the granulator. Table 3 illustrates the cumulative feed screen analysis of five different samples of potassium sulfate and the degradation of granules prepared from such feed.

From this table, it can be seen that the granule strength is increased where a broad linear range of particle sizes are present in the feed material.

The effect of the quench sprays on the granule competency is shown in table 4. This table shows the particular material used in the quench solution, the original degradation and degradation after quenching and drying for six test samples of potassium sulfate granules.

TABLE 4

| Test Sample | Quench Solution Source | Percent Original Degradation | Percent Quenched Degradation |
|---|---|---|---|
| 1 | Langbeinite | 4.35% | 3.30% |
| 2 | Langbeinite | 4.25% | 4.00% |
| 3 | Langbeinite | 8.25% | 3.70% |
| 4 | Langbeinite | 5.3% | 3.94% |
| 5 | Leonite | 5.40% | 4.47% |
| 6 | $K_2SO_4$ | 6.40% | 4.30% |

From this table it can be seen that in all of the test samples, the degradation was improved and in some of the samples it was improved from greater than 5 percent to less than 5 percent.

Tables 5 and 6 are included to illustrate the effect on granule competency produced by the coating step. In these tests potassium sulfate granules were coated with a cottonseed oil and with a high wax petroleum oil sold by Continental Oil Company (identified as Conoco 9200c).

TABLE 5

| Oil Used | Percent by Weight | Percent Degradation Reduction |
|---|---|---|
| Cottonseed Oil | 0.3% | 23.5% |
| Cottonseed Oil | 0.7% | 58.7% |
| Cottonseed Oil | 1.3% | 74.5% |
| 9,200c | 0.2% | 11.5% |
| 9,200c | 0.5% | 38.2% |
| 9,200c | 1.0% | 45.6% |

TABLE 6

| Degradation Without Treatment | Degradation Quenched | Degradation Oiled | Degradation Quenched & Oiled |
|---|---|---|---|
| 3.45% | 1.10% | 1.90% | 0.30% |
| 4.50% | 3.35% | 3.20% | 2.70% |
| 3.80% | 2.00% | 2.40% | 1.80% |

From table 5 it can be seen that even a very small percent of coating liquid may produce a very substantial reduction in the percent degradation. While the cottonseed oil was quite effective, the petroleum oils are generally preferred to be used since they are less expensive. It is also preferred that approximately one-half of 1 percent by weight of the petroleum oil be used. Additionally, it has been recognized that the coating liquid used should be compatible with the quenching liquid. Table 6 shows the separate and combined effects of quenching and coating on three potassium sulfate granule samples.

TABLE 3

| Tyler mesh | Micron equivalent | Percent No. 1 | No. 2 | No. 3 | No. 4 | No. 5 |
|---|---|---|---|---|---|---|
| 35 | 420 | | | | 0.1 | 0.1 |
| 65 | 210 | 6.1 | 2.0 | 2.3 | 2.0 | |
| 100 | 149 | 19.4 | 6.5 | 6.4 | 5.5 | |
| 150 | 105 | 25.6 | 14.3 | 14.5 | 12.3 | |
| 200 | 74 | 32.0 | 24.9 | 25.0 | 19.7 | 0.5 |
| | 44 | 44.6 | 46.0 | 42.7 | 35.2 | 9.8 |
| | 30 | 56.0 | 87.0 | | 86.0 | 91.3 |
| 325 | 20 | | 95.0 | 87.7 | | 100.0 |
| | 10 | 76.0 | 98.0 | 97.0 | 99.0 | |
| | −10 | 24.0 | 2.0 | 3.0 | 1.0 | |
| Percent degradation | | 5.1 | 8.9 | 7.0 | 7.1 | 12.8 |

The use of the quenching and coating steps has been found to produce satisfactory granules when used in combination with the steps of adding cement and in easily dehydrated magnesium salt and allowing the cement to hydrate or when used to improve the competency of granules produced without the addition of cement and the magnesium salt. The quenching and coating steps may be used individually or in combination. As shown in the tables, both the quenching and the coating steps individually improve the competency of the granules.

The granules produced by the process of the present invention are of a uniform size and competency so they have excellent handling and storage properties. Such granules do not require a conditioner to prevent caking. The product granules are also of the desired size for application to the soil and have a high available plant nutrient content.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:

1. The method of producing a competent granular fertilizer including the steps of mixing and grinding potassium sulfate, an easily dehydrated magnesium salt and Portland cement, adding water to such mixed ground materials, granulating such mixed ground materials to produce granules of mixed materials, conducting said granules to a drying zone with each of said granules being conducted at a rate of speed to allow sufficient time for hydration, drying said granules in said drying zone, spraying an aqueous solution of an inorganic salt selected from the group consisting of potassium sulfate, an easily dehydrated magnesium salt and langbeinite on the dried granules to fill the voids in each of said granules with such solution, drying said granules, screening said granules to reject oversized and undersized granules, and spraying a coating oil on the desired size granules in an amount sufficient only to lightly coat said granules with said coating oil.

2. The method according to claim 1 wherein the amount of Portland cement used is approximately 1 percent by weight of the ground and mixed materials.

3. The method according to claim 1 wherein the easily dehydrated magnesium salt in the mixing and grinding step is leonite.

4. The method according to claim 3 wherein the amount of leonite used in the mixing and grinding step is between 8 and 10 percent by weight of the ground and mixed materials.

5. The method according to claim 1 wherein the easily dehydrated magnesium salt in the mixing and grinding step is $MgSO_4 \cdot 7bH_2O$.

6. The method according to claim 5 wherein the amount of $MgSO_4 \cdot 7bH_2O$ used in the mixing and grinding step is between 6 and 7.3 percent by weight of the ground and mixed materials.

7. The method according to claim 1 wherein said mixing and grinding step produces a mixed material having a broad linear range of particle size.

8. The method according to claim 1 wherein said coating oil is selected from a group consisting of a vegetable oil and a high wax petroleum oil.

9. The method according to claim 1 wherein approximately one-half of 1 percent by weight of said coating oil is used.

* * * * *